US006950561B2

United States Patent
Boroczky et al.

(10) Patent No.: US 6,950,561 B2
(45) Date of Patent: Sep. 27, 2005

(54) METHOD AND SYSTEM FOR SHARPNESS ENHANCEMENT FOR CODED VIDEO

(75) Inventors: Lilla Boroczky, Mount Kisco, NY (US); Johan G. Janssen, South Salem, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 719 days.

(21) Appl. No.: 09/976,340

(22) Filed: Oct. 12, 2001

(65) Prior Publication Data

US 2002/0122603 A1 Sep. 5, 2002

Related U.S. Application Data

(60) Provisional application No. 60/260,845, filed on Jan. 10, 2001.

(51) Int. Cl.$^7$ .................................................. G06K 9/40
(52) U.S. Cl. ...................................... 382/263; 382/275
(58) Field of Search ................................ 382/199, 235, 382/263, 266, 268, 274, 275; 375/240.03, 240.2, 240.29; 348/622, 627; 358/532, 535, 539

(56) References Cited

U.S. PATENT DOCUMENTS

| 5,038,388 A | * | 8/1991 | Song .......................... 382/266 |
| 6,466,624 B1 | * | 10/2002 | Fogg ...................... 375/240.27 |
| 6,580,835 B1 | * | 6/2003 | Gallagher et al. .......... 382/274 |
| 6,600,839 B2 | * | 7/2003 | Mancuso et al. ........... 382/268 |

OTHER PUBLICATIONS

"A Compressed Video Enhancement Algorithm", by Chun–Jen Tsai et al., Proceedings of IEEE ICIP 1999, Kobe Japan, Oct. 25–28, 1999.
"Improved Decoding of MPEG–2 Coded Video", by B. Martins et al., Proceedings of IBC '2000, Amsterdam, The Netherlands, Sep. 7–12, 2000, pp. 109–115.

* cited by examiner

Primary Examiner—Kanjibhai Patel

(57) ABSTRACT

A system, (i.e., a method, an apparatus, and computer-executable process steps), providing sharpness enhancement for coded video, in which a usefulness metric, calculates how much a pixel can be enhanced without increasing coding artifacts. The usefulness metric is separate from the enhancement algorithm such that a variety of different enhancement algorithms can be used in conjunction with the metric.

45 Claims, 2 Drawing Sheets

METHOD AND SYSTEM FOR SHARPNESS ENHANCEMENT FOR CODED VIDEO

The present invention is entitled to the benefit of Provisional Patent Application Ser. No. 60/260,845 filed Jan. 10, 2001.

BACKGROUND OF THE INVENTION

1. Cross-Reference to Related Applications

This invention uses the UME of co-pending application, Apparatus and Method for Providing a Usefulness Metric based on Coding Information for Video Enhancement, inventors Lilla Boroczky and Johan Janssen, filed concurrently herewith.

2. Field of the Invention

The present invention is directed to a system and method for enhancing the sharpness of encoded/transcoded digital video, without enhancing encoding artifacts, which has particular utility in connection with spatial domain sharpness enhancement algorithms used in multimedia devices.

3. Description of the Related Art

The development of high-quality multi-media devices, such as set-top boxes, high-end TV's, Digital TV's, Personal TV's, storage products, PDA's, wireless internet devices, etc., is leading to a variety of architectures and to more openness towards new features for these devices. Moreover, the development of these new products and their ability to display video data in any format, has resulted in new requirements and opportunities with respect to video processing and video enhancement algorithms. Most of these devices receive and/or store video in the MPEG-2 format and in the future they may receive/store in the MPEG-4 format. The picture quality of these MPEG sources can vary between very good and extremely bad.

Next generation storage devices, such as the blue-laser-based Digital Video Recorder (DVR) will have to some extent HD (ATSC) capability and are an example of the type of device for which a new method of picture enhancement would be advantageous. An HD program is typically broadcast at 20 Mb/s and encoded according to the MPEG-2 video standard. Taking into account the approximately 25 GB storage capacity of the DVR, this represents about a two-hour recording time of HD video per disc. To increase the record time, several long-play modes can be defined, such as Long-Play (LP) and Extended-Long-Play (ELP) modes.

For LP-mode the average storage bitrate is assumed to be approximately 10 Mb/s, which allows double record time for HD. As a consequence, transcoding is an integral part of the video processing chain, which reduces the broadcast bitrate of 20 Mb/s to the storage bitrate of 10 Mb/s. During the MPEG-2 transcoding, the picture quality (e.g., sharpness) of the video, is most likely reduced. However, especially for the LP mode, the picture quality should not be compromised too much. Therefore, for the LP mode, post-processing plays an important role in improving the perceived picture quality.

To date, most of the state-of-the-art sharpness enhancement algorithms were developed and optimized for analog video transmission standards like NTSC, PAL and SECAM. Traditionally, image enhancement algorithms either reduce certain unwanted aspects in a picture (e.g., noise reduction) or improve certain desired characteristics of an image (e.g., sharpness enhancement). For these emerging storage devices, the traditional sharpness enhancement algorithms may perform sub-optimally on MPEG encoded or transcoded video due to the different characteristics of these sources. In the closed video processing chain of the storage system, information which allows for determining the quality of the encoded source can be derived from the MPEG stream. This information can potentially be used to increase the performance of image enhancement algorithms.

Because image quality will remain a distinguishing factor for high-end video products, new approaches for performing image enhancement, specifically adapted for use with these sources, will be beneficial. In C-J Tsai, P. Karunaratne, N. P. Galatsanos and A. K. Katsaggelos, "A Compressed Video Enhancement Algorithm", *Proc. of IEEE*, ICIP'99, Kobe, Japan, Oct. 25–28, 1999, the authors propose an iterative algorithm for enhancing video sequences that are encoded at low bit rates. For MPEG sources, the degradation of the picture quality originates mostly from the quantization function. Thus, the iterative gradient-projection algorithm employed by the authors uses coding information such as quantization step size, macroblock types and forward motion vectors in its cost function. The algorithm shows promising results for low bit rate video, however its main disadvantage is its high computational complexity.

In B. Martins and S. Forchhammer, "Improved Decoding of MPEG-2 Coded Video", *Proc. of IBC'*2000, Amsterdam, The Netherlands, Sep. 7–12, 2000, pp. 109–115, the authors describe a new concept for improving the decoding of MPEG-2 coded video. Specifically, a unified approach for deinterlacing and format conversion, integrated in the decoding process, is proposed. The technique results in considerably higher picture quality than that obtained by ordinary decoding. However, to date, its computational complexity prevents its implementation in consumer applications.

Both papers describe video enhancement algorithms using MPEG coding information and a cost function. However, both of these scenarios, in addition to being impractical, combine the enhancement and the cost function. A cost function determines how much, and at which locations in a picture, enhancement can be applied. The problem which results from this combination of cost and enhancement functions is that only one algorithm can be used with the cost function.

OBJECT AND SUMMARY OF THE INVENTION

The present invention addresses the foregoing needs by providing a system, (i.e., a method, an apparatus, and computer-executable process steps), in which a usefulness metric, calculates how much a pixel can be enhanced without increasing coding artifacts.

It is an object of this invention to provide a system in which the usefulness metric is separate from the enhancement algorithm such that a variety of different enhancement algorithms can be used in conjunction with the metric.

It is a further object of the invention to provide a usefulness metric which can be tuned towards the constraints of the system such that an optimal trade-off between performance and complexity is assured.

It is a further object of the invention to provide a system of image enhancement which will perform optimally with encoded and transcoded video sources.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

For a better understanding of the invention, reference is made to the following drawings.

DETAILED DESCRIPTION OF THE PREFERRED EMBODIMENTS

Figure 1:
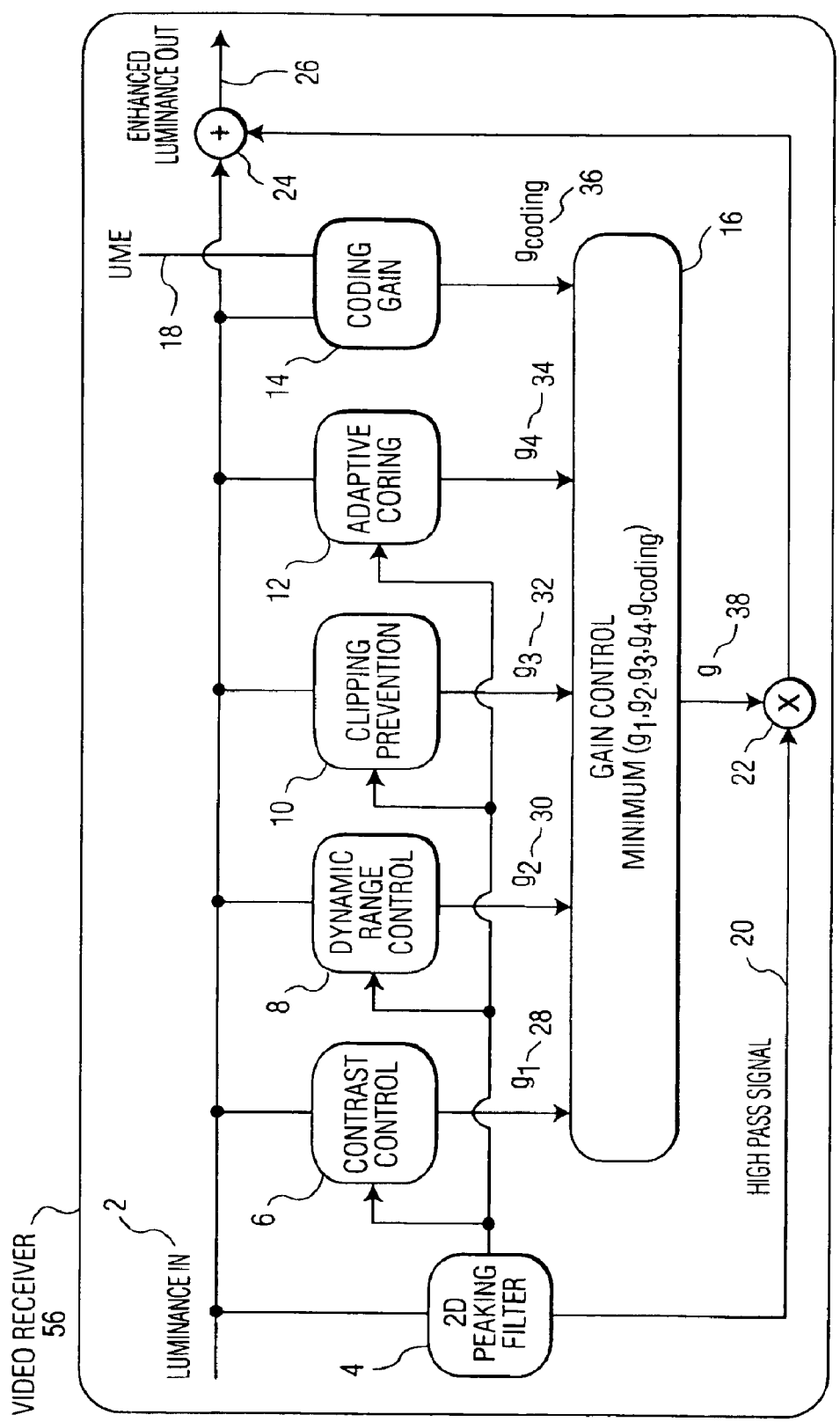
FIG. 1 is a block diagram of the invention.

FIG. 1 shows a system in which the present invention can be implemented, for example, in a video receiver 56. FIG. 1 illustrates how a usefulness metric (UME) can be applied to, a sharpness enhancement algorithm, adaptive peaking, for example. (Other sharpness enhancement algorithms, besides adaptive peaking, can also be used.) The adaptive peaking algorithm, directed at increasing the amplitude to the transient of a luminance signal 2, does not always provide optimal video quality for an a priori encoded/transcoded video source. This is mainly a result of the fact that the characteristics of the MPEG source are not taken into account. In the present invention, a UME is generated, which does take into account the characteristics of the MPEG source. The example algorithm, adaptive peaking, is extended to use this UME, thereby increasing the performance of the algorithm significantly.

The adaptive peaking algorithm and the principle of adaptive peaking, are well known in the prior art. An example is shown in FIG. 1. The algorithm includes four control blocks, 6 8 10 12. These pixel-based control blocks 6 8 10 12 operate in parallel and each calculate a maximum allowable gain factor g1 g2 g3 g4, respectively, to achieve a target image quality. These control blocks 6 8 10 12 take into account particular local characteristics of the video signal such as contrast, dynamic range, and noise level, but not coding properties. The coding gain block 14 uses the usefulness metric (UME) 18 to determine the allowable amount of peaking $g_{coding}$ 36. A dynamic gain control 16 selects the minimum of the gains g1 28, g2 30, g3 32, g4 34, which is added to the $g_{coding}$ generating a final gain g 38. The multiplier 22, multiplies the final gain 38 by the high-pass signal 20, which has been filtered by the 2D peaking filter 4. The adder 24 adds this product to the original luminance value of a pixel 2. In this manner, the enhanced luminance signal 26 is generated.

The UME 18 calculates on a pixel by pixel basis, how much a pixel or region can be enhanced without increasing coding artifacts. The UME 18 is derived from the MPEG coding information present in the bitstream.

Choosing the MPEG information to be used with the UME 18 is far from trivial. The information must provide an indication of the spatio-temporal characteristics or picture quality of the video.

The finest granularity of MPEG information, which can be directly obtained during decoding is either block-based or macroblock-based. However for spatial (pixel) domain video enhancement, the UME 18 must be calculated for each pixel of a picture in order to ensure the highest picture quality.

One parameter easily extracted from MPEG information is the quantization parameter, as it is present for every coded macroblock (MB). The higher the quantization parameter, the coarser the quantization, and therefore, the higher the quantization error. A high quantization error results in coding artifacts and consequently, enhancement of pixels in a MB with a high quantization parameter must be suppressed more.

Another parameter that can easily be extracted from the MPEG stream is the number of bits spent in coding a MB or block. The value of the aforementioned coding information is dependent upon other factors including: scene content, bitrate, picture type, and motion estimation/compensation.

Both the quantization parameter and the number of bits spent are widely used in rate control calculations of MPEG encoding and are commonly used to calculate the coding complexity. Coding complexity is defined as the product of the quantization parameter and the number of bits spent to encode a MB or block. Coding complexity is therefore described by the following equation:

$$\text{compl}_{MB/block}(k,l) = \text{mquant}(k,l) * \text{bits}_{MB/block}(k,l)$$

where mquant is the quantization parameter and $\text{bits}_{MB/block}$ is the number of bits of DCT coefficients used to encode the MB or block(k,l). The underlying assumption is that the higher the complexity of a MB or block with respect to the average complexity of a frame, the higher the probability of having coding artifacts in that MB or block. Thus, enhancement should be suppressed for the pixels of the blocks with relatively high coding complexity.

Accordingly, the UME 18 of pixel(i,j) can be defined by the following equation:

$$UME(i,j) = 1 - \text{compl}_{pixel}(i,j)/2 * \overline{\text{compl}}$$

where $\text{compl}_{pixel}(i,j)$ is the coding complexity of pixel (i,j) and $\overline{\text{compl}}$ is the average coding complexity of a picture. In the present invention, $\text{compl}_{pixel}(i,j)$ is estimated from the MB or block complexity map FIG. 2 48 by means of bilinear interpolation FIG. 2 58.

In one aspect of the invention, UME(i,j) can range from 0 to 1. In this aspect, zero means that no sharpness enhancement is allowed for a particular pixel, while 1 means that the pixel can be freely enhanced without the risk of enhancing any coding artifacts.

The UME equation can be extended, by the addition of a term directly related to the quantization parameter, to incorporate a stronger bitrate dependency. This can be especially advantageous for video that has been encoded at a low bitrate.

Figure 2:
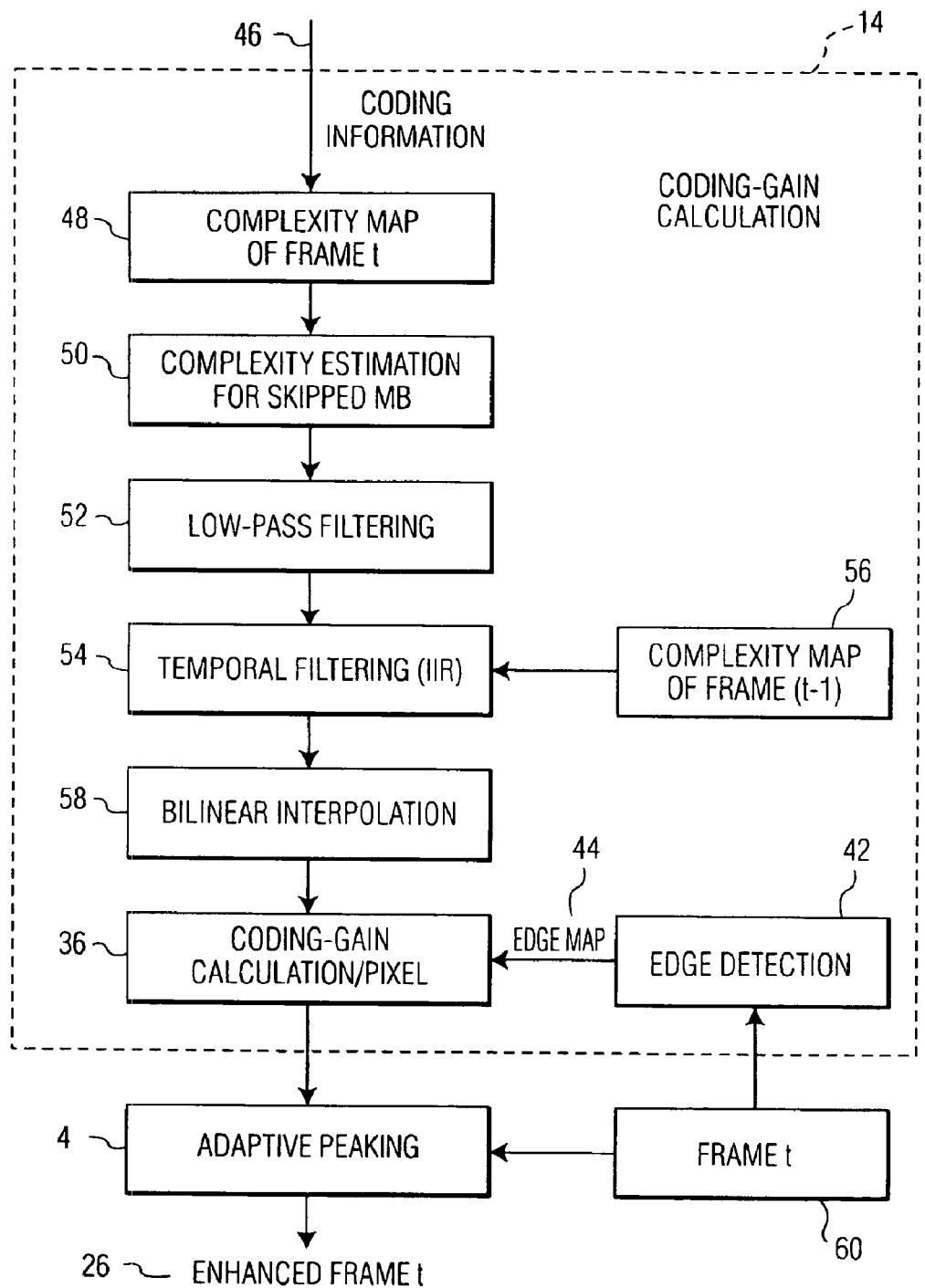
FIG. 2 is a flowchart of the invention using only the coding gain.

For skipped or uncoded MBs/blocks, the UME is estimated FIG. 2 50 from surrounding values.

Because the UME 18 is calculated to account for coding characteristics, it only prevents the enhancement of coding artifacts such as blocking and ringing. Thus, the prevention or reduction of artifacts of non-coding origin, which might result from applying too much enhancement, is addressed by other parts of the sharpness enhancement algorithm.

The aforementioned UME 18 can be combined with any peaking algorithm, or it can be adapted to any spatial domain sharpness enhancement algorithm. It is also possible to utilize coding information FIG. 2 46 and incorporate scene content related information FIG. 2 44, in combination with an adaptive peaking algorithm.

In this embodiment, shown in FIG. 2, the four control blocks 6 8 10 12 shown in FIG. 1 are eliminated. Scene content information, such as edge information 44, is incorporated into the coding gain calculation via the edge detection 42. The scene-content related information 44 compensates for the uncertainty of the UME calculation FIG. 1 18, the uncertainty resulting from assumptions made and interpolations applied in its calculation, FIG. 2 58 36.

In this embodiment, the coding gain of a pixel (i,j) 36 is determined by summing the UME which is embedded in the coding gain calculation 36 with an Edge Map 44 related term according to the equation below:

$$g_{coding}(i,j) = UME(i,j) + g_{edge}(i,j)$$

UME is defined above and $g_{edge}$ is based on edge-related pixel information.

It should be noted that the complexity map 56 of the MB/block has an inherited block structure. To decrease this non-desirable characteristic of the complexity map 56, a spatial low-pass filtering 52 is applied by a filter. An example filter kernel, which can be used for low-pass filtering is:

$$LP_{compl\_map} = \begin{bmatrix} 1 & 1 & 1 \\ 1 & 1 & 1 \\ 1 & 1 & 1 \end{bmatrix}$$

Another problem is that abrupt frame to frame changes in the coding gain for any given pixel can result in temporally inconsistent sharpness enhancement, which is undesirable. Such changes can also intensify temporally visible and annoying artifacts such as mosquito noise.

To remedy this effect, temporal filtering 54 is applied to the coding gain using the gain of the previous frame. To reduce the high computational complexity and memory requirement, instead of filtering the gain-map, the MB or block-based complexity map 48 is filtered temporally using an IIR filter 54. The following equation represents this processing:

$$compl_{MB/block}(r,s,t) = k*compl_{MB/block}(r,s,t) + scal*(1-k)*compl_{MB/block}(r,s,t-1)$$

where r,s is the spatial coordinate of a MB or block, t represents the current picture, k is the IIR filter coefficient and scal is a scaling term taking into account the complexity differences among different picture types. The coding gain 36 is then applied to the adaptive peaking algorithm using the frame t 60 to produce an enhanced frame t 60.

The invention can also be applied to HD and SD sequences such as would be present in a video storage application having HD capabilities and allowing long-play mode. The majority of such video sequences are transcoded to a lower storage bitrate from broadcast MPEG-2 bitstreams. For the long play mode of this application, format change can also take place during transcoding. Well-known SD video sequences encoded, decoded, and then processed with the sharpness enhancement algorithm, according to the present invention, provide superior video quality for a priori encoded or transcoded video sequences as compared to algorithms that do not use coding information.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

We claim:

1. A method for enhancing image quality comprising:
    developing a usefulness metric which identifies a limit to sharpness enhancement that can be applied to decoded video without enhancing coding artifacts; and
    applying the usefulness metric to at least one sharpness enhancement algorithm, the usefulness metric and the sharpness enhancement algorithm being separate such that the usefulness metric can be used with a variety of algorithms.

2. A method for enhancing the sharpness of a coded digital video, comprising the steps of:
    selecting and extracting statistical information from a coded video bit stream in order to identify the video's coding complexity;
    based upon the coding complexity, developing a usefulness metric for the coded video, which identifies a limit to sharpness enhancement that can be applied to the coded video after it is decoded, without enhancing coding artifacts; and
    applying a sharpness enhancement algorithm to the decoded video to increase sharpness within the limit prescribed by the usefulness metric.

3. The method as claimed in claim 2 wherein the sharpness enhancement algorithm is a peaking algorithm.

4. The method as claimed in claim 2 wherein the sharpness enhancement algorithm is a spatial-domain algorithm.

5. The method as claimed in claim 2 wherein the usefulness metric is calculated on a pixel-by-pixel basis.

6. The method as claimed in claim 2 wherein the coding complexity is defined as the product of a quantization parameter and a number of bits used to code a macro block.

7. The method as claimed in claim 2 wherein the coding complexity is defined as the product of a quantization parameter and a number of bits used to code a block.

8. The method as claimed in claim 2, wherein the usefulness metric occupies a range, a first terminus of the range meaning no sharpness enhancement is allowed for a particular pixel and second terminus of the range meaning that the pixel can be freely enhanced.

9. The method as claimed in claim 2, wherein the method is also applied to skipped macroblocks, the usefulness metric being estimated based upon the coding complexity of surrounding macro blocks or the coding complexity of a previous frame.

10. The method as claimed in claim 2, wherein the method is also applied to uncoded blocks, the usefulness metric being estimated based upon the coding complexity of surrounding blocks or the coding complexity of a previous frame.

11. The method as claimed in claim 2, wherein in addition to the usefulness metric, scene-content related information is incorporated into a coding gain calculation.

12. The method as claimed in claim 2, wherein the scene-content related information is derived from edge information.

13. The method as claimed in claim 5, wherein coding gain of a pixel is determined by the equation:

$$g_{coding}(i,j) = UME(i,j) + g_{edge}(i,j)$$

and wherein i and j are pixel coordinates, $g_{coding}$ is the pixel coding gain, UME is the usefulness metric and $g_{edge}$ is based upon edge-related information derived from the image.

14. The method as claimed in claim 13, wherein spatial low-pass filtering is applied to a complexity map calculated from the coded digital video.

15. The method as claimed in claim 13, wherein temporal filtering is applied to the coding gain using the coding gain of a previous frame.

16. The method as claimed in claim 13, wherein the equation can be extended to include an additional term directly related to the quantization parameter.

17. The method as claimed in claim 6, wherein a block-based complexity map is filtered temporally using an IIR filter.

18. The method as claimed in claim 6, wherein a macro block-based complexity map is filtered temporally using an IIR filter.

19. The method as claimed in claim 17 or 18, wherein the temporal filtering is in accordance with the following equation:

$$\mathrm{compl}_{MB/block}(r,s,t) = k*\mathrm{compl}_{MB/block}(r,s,t) + \mathrm{scal}*(1-k)*\mathrm{compl}_{MB/block}(r,s,t-1)$$

and wherein r,s is the spatial coordinate of a macro block or block, t represents the current picture, k is the IIR filter coefficient and scal is a scaling term taking into account picture complexity determined by the image's picture type.

20. A device for image quality enhancement comprising:
   a peaking filter which filters a decoded luminance signal, generating a high pass signal;
   a plurality of pixel based control blocks, operating in parallel on the decoded luminance signal, each calculating a maximum allowable gain factor, based upon a characteristic of the luminance signal, wherein at least one control block is a coding gain block which implements a usefulness metric which determines the allowable amount of peaking;
   a dynamic gain control for selecting a minimum gain based upon the calculated maximum gain factors;
   a multiplier for multiplying the high pass signal by the minimum gain generating a multiplied signal; and
   an adder for combining the decoded luminance signal with the multiplied signal, generating an enhanced signal.

21. A device as claimed in claim 20, wherein the control blocks comprise:
   a contrast control block;
   a dynamic range control block;
   a clipping prevention control block;
   an adaptive coring control block; and
   a coding gain block, all of the blocks being connected in parallel.

22. A device for enhancing an image quality of a digital video comprising:
   a usefulness metric generator which identifies a limit to sharpness enhancement that can be applied, without enhancing coding artifacts, to decoded digital video;
   a controller which applies the usefulness metric to at least one sharpness enhancement algorithm, the usefulness metric and the sharpness enhancement algorithm being separate such that the usefulness metric can be used with a variety of algorithms.

23. A system which enhances sharpness of a coded digital video, comprising:
   a selector which selects and extracts statistical information from a coded video bit stream in order to identify the video's coding complexity;
   a usefulness metric generator that, based upon the coding complexity, develops a usefulness metric for the coded digital video after decoding, which identifies a limit to sharpness enhancement that can be applied to a decoded video without enhancing coding artifacts; and
   a sharpness enhancer which applies a sharpness enhancement algorithm to the decoded video to increase sharpness within the limit prescribed by the usefulness metric.

24. The system as claimed in claim 23, wherein the sharpness enhancement algorithm is a peaking algorithm.

25. The system as claimed in claim 23, wherein the sharpness enhancement algorithm is a spatial-domain algorithm.

26. The system as claimed in claim 23, wherein the usefulness metric is calculated on a pixel-by-pixel basis.

27. The system as claimed in claim 23, wherein the coding complexity is defined as the product of a quantization parameter and a number of bits used to code a macro block.

28. The system as claimed in claim 23, wherein the coding complexity is defined as the product of a quantization parameter and a number of bits used to code a block.

29. The system as claimed in claim 23, wherein the usefulness metric occupies a range, a first terminus of the range zero meaning no sharpness enhancement is allowed for a particular pixel and a second terminus of the range meaning that the pixel can be freely enhanced.

30. The system as claimed in claim 23 wherein the system is also applied to skipped macro blocks, the usefulness metric being estimated based upon the coding complexity of surrounding macro blocks or based upon the coding complexity of a previous frame.

31. The system as claimed in claim 23, wherein the system is also applied to uncoded blocks, the usefulness metric being estimated based upon the coding complexity of surrounding blocks or the coding complexity of a previous frame.

32. The system as claimed in claim 23, wherein in addition to the usefulness metric, scene-content related information is incorporated into a coding gain calculation.

33. The system, as claimed in claim 32, wherein the scene-content related information is derived from edge information.

34. The system as claimed in claim 23, wherein coding gain of a pixel is determined by the equation:

$$g_{coding}(i,j) = UME(i,j) + g_{edge}(i,j)$$

and wherein i and j are pixel coordinates, $g_{coding}$ is the pixel coding gain, UME is the usefulness metric and $g_{edge}$ is derived from edge-related information derived from the image.

35. The system as claimed in claim 23, wherein spatial low-pass filtering is applied to a complexity map calculated from the coded digital video stream.

36. The system as claimed in claim 23, wherein temporal filtering is applied to a coding gain based upon a coding gain of a previous frame.

37. The system as claimed in claim 34, wherein the equation can be extended to include an additional term directly related to the quantization parameter.

38. The system as claimed in claim 36, wherein a block-based complexity map is filtered temporally using an IIR filter.

39. The system as claimed in claim 36, wherein a macro block-based complexity map is filtered temporally using an IIR filter.

40. The system as claimed in claim 36, wherein the temporal filtering is in accordance with the following equation:

$$\mathrm{compl}_{MB/block}(r,s,t) = k*\mathrm{compl}_{MB/block}(r,s,t) + \mathrm{scal}*(1-k)*\mathrm{compl}_{MB/block}(r,s,t-1)$$

and wherein r,s is the spatial coordinate of a macroblock (MB) or block, t represents the current picture, k is the IIR filter coefficient and scal is a scaling term taking into account picture complexity determined by the image's picture type.

41. Computer-executable process steps to enhance image quality, the computer-executable process steps being stored on a computer-readable medium and comprising:
   an extracting step to extract statistical information from a coded video bit stream in order to identify a video's coding complexity;

a generating step to generate a usefulness metric for a coded video based upon the coding complexity, which identifies a limit to sharpness enhancement that can be applied to the coded video after decoding without enhancing coding artifacts; and an enhancement step to enhance the sharpness of the image by applying a sharpness enhancement algorithm to a decoded video to increase sharpness within the limit prescribed by the usefulness metric.

42. A system for enhancing the sharpness of a coded digital video, comprising:

extracting means for extracting statistical information from a coded video bit stream in order to identify the coded digital video's coding complexity;

generating means for developing a usefulness metric for the coded digital video, based upon the coding complexity, which identifies a limit to sharpness enhancement that can be applied to the coded digital video after decoding without enhancing coding artifacts; and enhancement means for applying a sharpness enhancement algorithm to a decoded video to increase sharpness within the limit prescribed by the usefulness metric.

43. A system for generating a signal, embodied in a carrier wave, representing data for enhancing sharpness of a decoded digital video, comprising:

statistical information selected from a coded video bit stream to be used in identifying the complexity of a video;

a usefulness metric, based upon the complexity of the video, which identifies a limit to sharpness enhancement which can be applied to the decoded video without enhancing coding artifacts; and a sharpness enhancement algorithm to be used for increasing the sharpness of the decoded video within the limit prescribed by the usefulness metric.

44. A method for enhancing image quality comprising the steps of:

peaking filtering a coded luminance signal, increasing the amplitude of the luminance signal and generating a high pass signal;

calculating at least one maximum gain factor for the luminance signal, based on a characteristic of the luminance signal, wherein at least one gain factor calculation implements a usefulness metric which determines an allowable amount of peaking which will not intensify coding artifacts;

selecting a minimum gain from the maximum gain factors;

multiplying the high pass signal by the minimum gain generating a multiplied signal; and adding a decoded luminance signal with the multiplied signal, generating an enhanced signal.

45. A video receiving device comprising:

a peaking filter which filters a decoded luminance signal, generating a high pass signal;

a plurality of pixel based control blocks, operating in parallel on the decoded luminance signal, each calculating a maximum allowable gain factor, based upon a characteristic of the luminance signal, wherein at least one control block is a coding gain block which implements a usefulness metric which determines the allowable amount of peaking;

a dynamic gain control for selecting a minimum gain based upon the calculated maximum gain factors;

a multiplier for multiplying the high pass signal by the minimum gain generating a multiplied signal; and an adder for combining the decoded luminance signal with the multiplied signal, generating an enhanced signal.

* * * * *